Patented Mar. 19, 1935

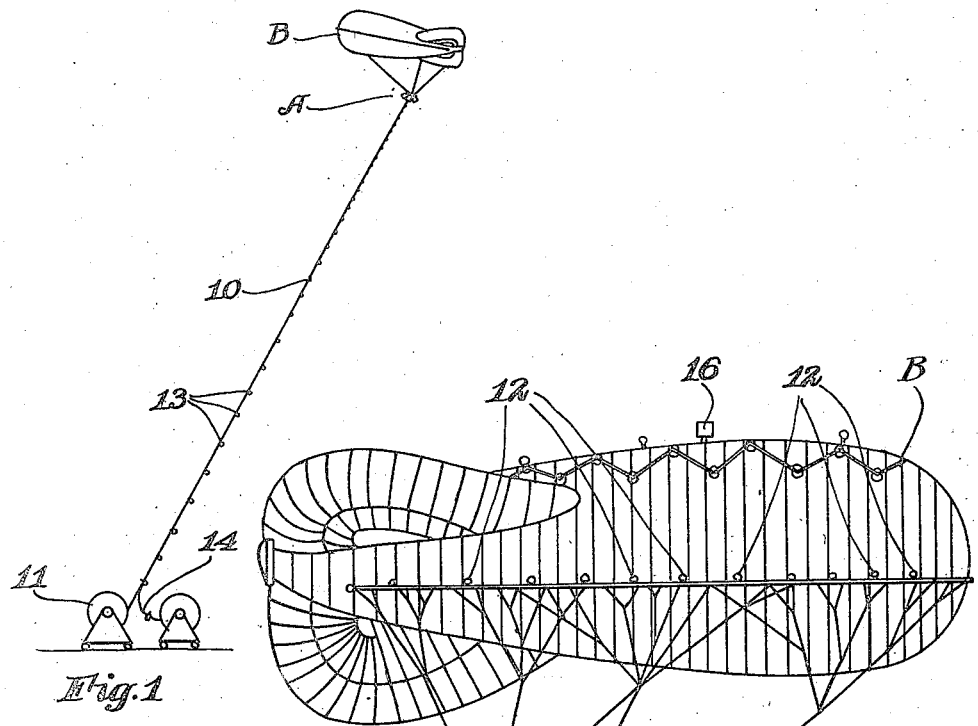
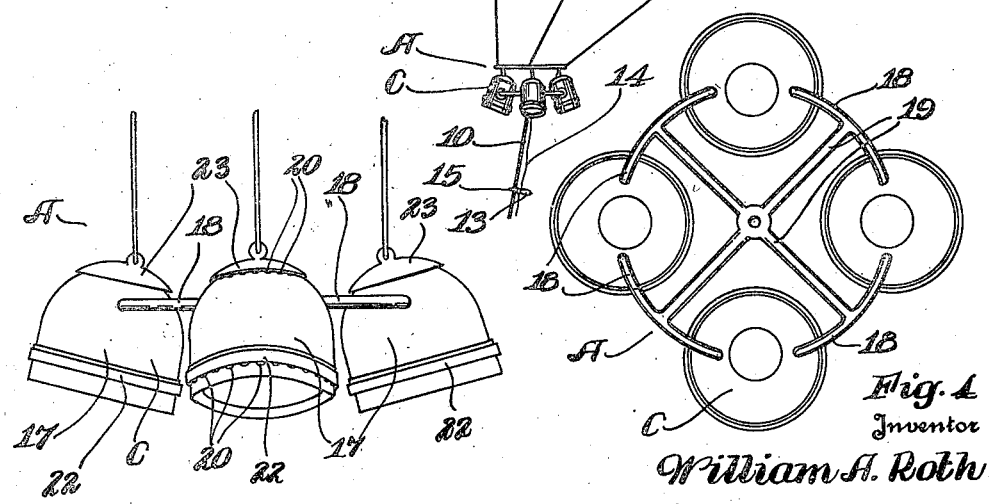

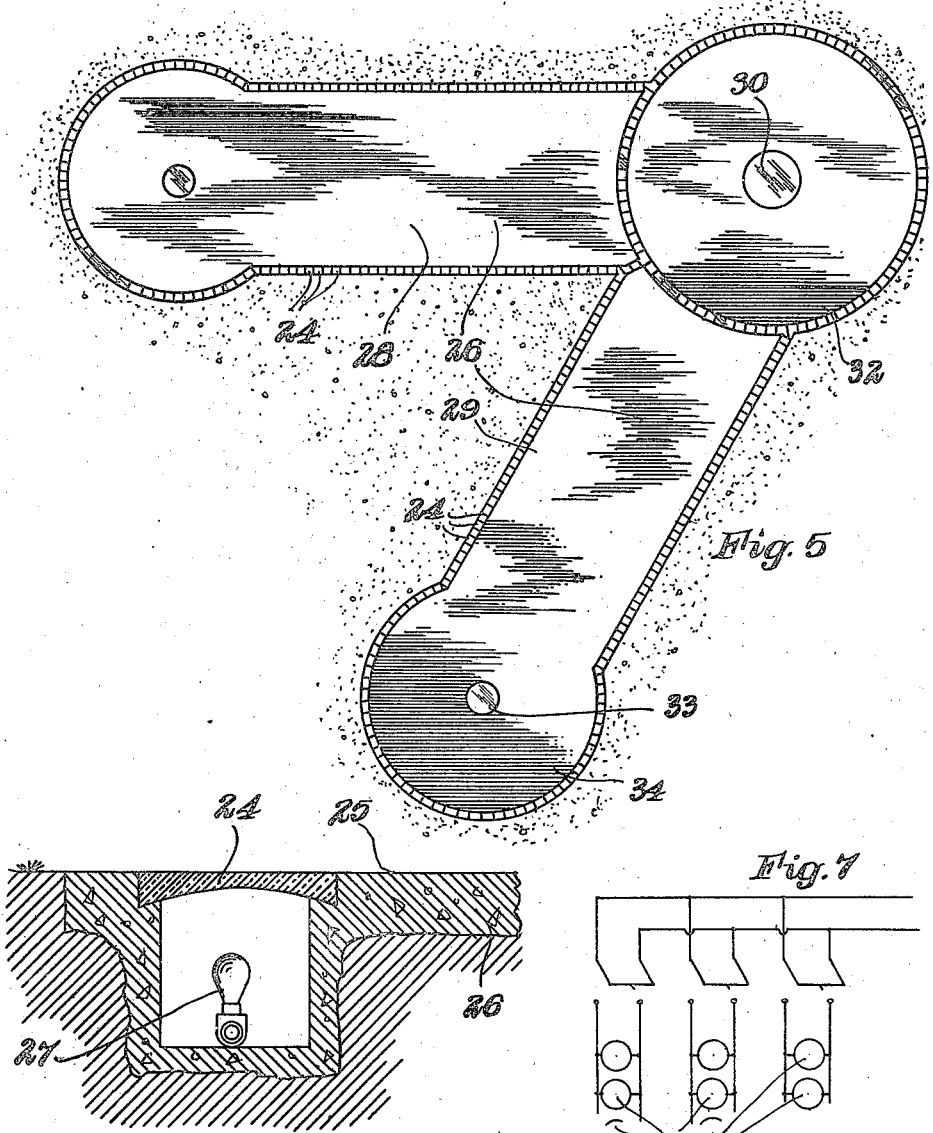

UNITED STATES PATENT OFFICE 1,994,535

LIGHTING AIRWAYS

William A. Roth, St. Paul, Minn., assignor of one-eleventh to Clarence G. Anderson, one-eleventh to William O. Larson, one-eleventh to William P. Baker, all of South St. Paul, Minn., one-eleventh to Marshall O. Larson, one-eleventh to Ruben B. Lind, one-eleventh to Albert Ostrom, one-eleventh to Trew F. Poole, two-elevenths to James Volkes, all of St. Paul, Minn., and one-eleventh to Henry J. Roth, New London, Minn.

Application October 26, 1929, Serial No. 402,636

5 Claims. (Cl. 240—1.2)

My invention relates to a method of airport lighting, wherein it is desired to provide an effective means for illuminating an airport at night.

My invention includes a means for lighting a landing field to provide a strong light over a large area. This is especially essential for use in conjunction with airports where a good light is necessary in order that airplane pilots may accurately judge height and distance, and clearly see any obstructions.

It is my object to provide a light which will thoroughly illuminate a landing field and at the same time prevent the pilot from being blinded by the glare of floodlights or spotlights mounted near the surface of the field.

It is my object to provide a light which may be seen from a great distance, to act as a beacon for approaching planes, and to aid the pilot in distinguishing the landing field at night or in foggy weather.

It is my further object to provide a light which may be seen above low-hanging clouds or fog, to aid the pilot in determining the position of landing fields in stormy or foggy weather without flying dangerously near to the ground. This will provide a safeguard against the situation often arising wherein a pilot cannot land, being unable to see the landing field lights through the fog or clouds without flying dangerously low, or wherein a plane is wrecked by striking obstructions on the ground as a pilot descends low in order to get his bearings.

It is my purpose to provide a light or number of lights mounted on a captive balloon in such a manner as to effectively illuminate a landing field from far above the field, insuring a good bright light over a large territory. It is my further purpose to supplement this overhead light with a system of outlining lights to outline a field or a runway in order that a pilot may tell at a glance the proper part of the field on which to land, even though he be unfamiliar with the landing field.

It is an object of my invention to mount a series of lights beneath strong transparent or translucent panes set into the earth level with the field, so that a plane may roll over them without danger of injuring the panes or lights. A runway outlined by a series of such lights could be easily seen from the air, and the plane could be landed with great facility.

Other novel features and objects of my invention will become apparent during the course of the following specification and claims.

In the drawings:

Figure 1 illustrates my airport light in use.

Figure 2 illustrates a form of captive balloon used to support my airport light.

Figure 3 is a side view of a method of attaching a series of lights together.

Figure 4 is a plan view of the same.

Figure 5 is a plan view of an airport runway outlined with my underground lights.

Figure 6 is a detail of the method of installing the same.

Figure 7 is a diagrammatic detail showing the means of lighting any one of the runways.

My airport light A is composed of a supporting balloon B which supports a light or cluster of lights C, and which balloon is held captive by a cable 10 connecting the balloon to a movable winch 11 or windlass for raising and lowering the balloon B. Upon this balloon I mount a series of lights 12, which illuminate the balloon to prevent approaching planes from colliding with it, and I also place lights 13 at intervals along an auxiliary cable 14 which is wound up or spread out upon the ground separately from the connecting cable 10 when the same is not being used and which may be clipped firmly to the connecting cable 10 by the clips 15 as the cable 10 is unwound. When desired, it is also possible to mount a revolving beacon light 16 upon the balloon which, because of its height may be seen from a great distance, and aid to guide pilots to the airport.

In mounting the lights C, I support the lights in a manner to cause the tilting of the balloon and lights when driven to one side by the wind in order that the lights will act automatically to keep virtually centered at all times, as is shown in Figure 1. The cable 10 is secured to the center of the light supporting frame and acts to pull the lights centrally, keeping them virtually in line with the cable 10.

The lights may be of any desired type to illuminate the field to the best advantage, and to penetrate fog and clouds as well as possible. One method of supporting the lights C is shown in Figures 3 and 4. The light reflectors 17 are connected together by braces 18, and are strengthened by reinforcing members 19. The reflectors 17 are provided with ventilating holes 20, covered by rims 22 and covers 23 to allow circulation of air, but to keep out rain or snow from within the reflectors 17.

In order that the pilot may see plainly the direction and position where he should land on the field, I provide a series of heavy panes 24 made of glass or other transparent or translucent substance, set in the earth or in concrete even with the surface of the earth or surface 25 of the runway 26, and provide a series of lights 27 beneath this glass covered channel. These lights, shining through the glass panes 24, outline the runway upon which the plane is to descend, showing the pilot of an approaching plane at a glance the proper spot upon the field upon which to land.

In case there are a number of paved runways upon a field, to allow planes to land safely regardless of the direction of the wind, such as the two runways 28 and 29, illustrated in Figure 5, it is possible to illuminate only the proper runway for the weather conditions on any particular night, so that a pilot may know, upon seeing an illuminated runway, that that particular direction is the proper direction in which to land.

Lights 30 may be formed in the same manner as the border lights to illuminate or designate the center of the turning apron 32. These lights 30 may be of a different color from the border lights, to be readily distinguishable. Likewise, a light 33 may be placed at the terminal end 34 of the runway, to allow it to be easily seen. It would also be possible, upon a runway adapted to be travelled in both directions, to use these lights 30 and 33 for designating to the pilot the proper direction in which he should land upon the runway, by utilizing one color to signify the approach end, and another to signify the terminal end.

It is readily apparent that by my method of airport lighting I am able to virtually eliminate all glare for the pilot, the floodlights for the field being mounted high above the field, and the border lights for the runways being set down into the earth. With glare eliminated, night flying becomes much safer and pleasanter for both pilot and passenger.

In accordance with the patent statutes, I have endeavored to set forth the principles of my system of airport lighting, and while I have endeavored to illustrate the best embodiment thereof, I desire to have it understood that the same is only illustrative of a means of carrying out my invention, and that obvious changes may be made within the scope of the following claims without departing from the spirit of the invention.

I claim:

1. An airport lighting device including, a buoyant balloon, a frame suspended from various points on said balloon, a series of lights mounted on said frame facing downwardly and outwardly, and a cable centrally secured at one point to said frame to hold said balloon through the suspended frame.

2. An airport lighting device including, a buoyant balloon, a rigid frame, a series of flood lights suspended from said balloon on said frame, a reflector on each of said lights directing light downwardly and outwardly from a common center, and a plurality of spaced cable means connected to said frame to support said frame and a mooring cable centrally secured to said frame to hold said lights at all times virtually in line with said cable.

3. An airport lighting device including, a buoyant balloon, a rigid frame, flood light means secured to said frame, said lights directed downwardly and outwardly from a common center, spaced means for supporting said light means to said balloon, and a cable centrally connected to said frame for said light means to anchor said balloon and to direct said light virtually in the direction of said cable.

4. An airport lighting device including, a buoyant balloon, a reinforcing frame supported therefrom, spaced supporting means from said frame to said balloon, flood light means connected thereto, and anchoring cable means secured centrally to said frame to anchor said balloon through said light means to tend to hold said light means to direct light along said cable.

5. An airport lighting device including, a buoyant balloon, a series of flood light means, means for suspending said light means from various points on said balloon, reinforcing frame means connecting said light means together, anchoring cable means connected centrally to said light means, and cable connecting means tending to keep said flood lights directing light in the direction of said cable.

WILLIAM A. ROTH.